UNITED STATES PATENT OFFICE.

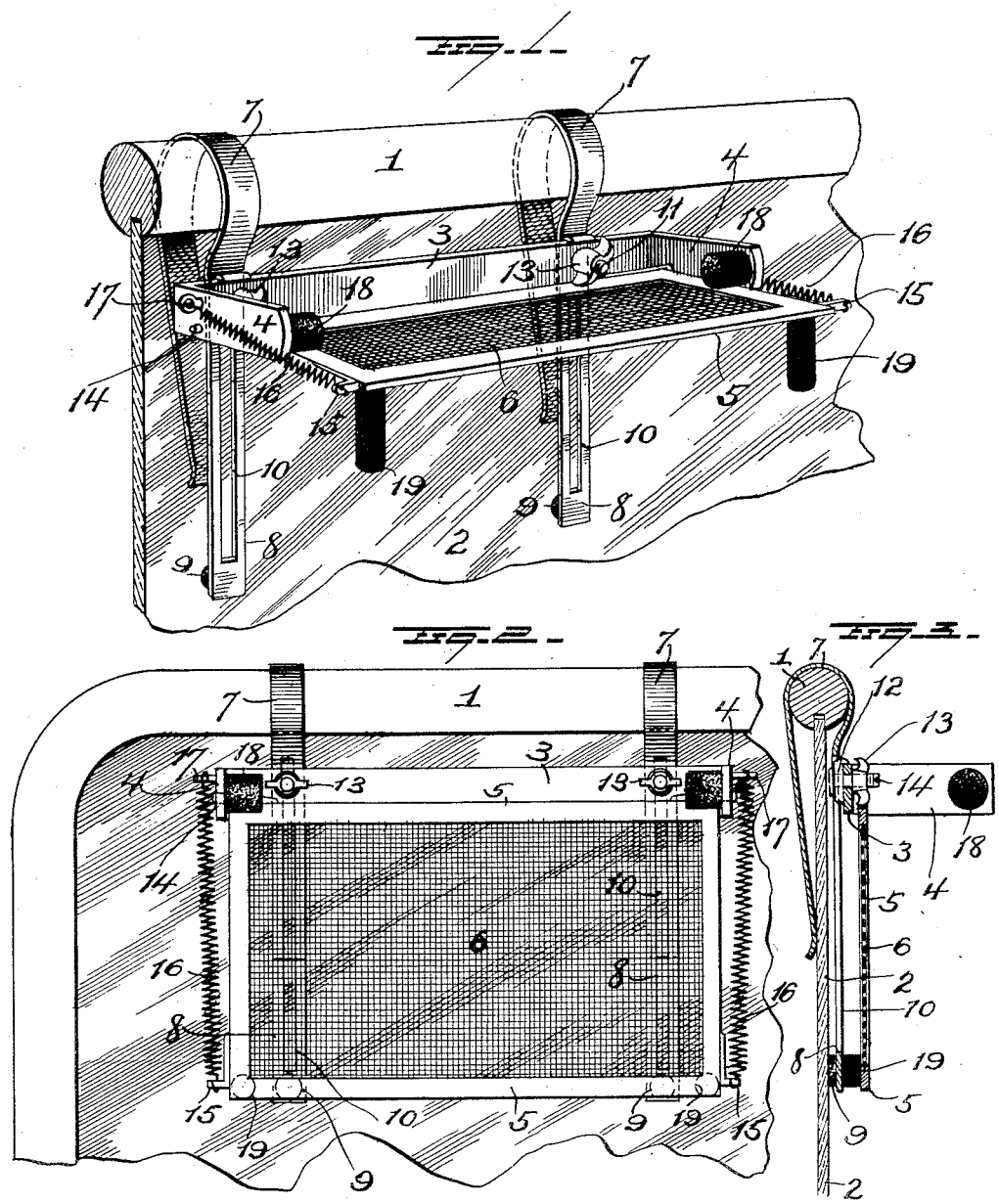

BURR CUSTER, OF MARION, INDIANA.

ATTACHMENT FOR WINDSHIELDS FOR AUTOMOBILES.

1,426,716.   Specification of Letters Patent.   Patented Aug. 22, 1922.

Application filed April 27, 1921. Serial No. 464,816.

*To all whom it may concern:*

Be it known that I, BURR CUSTER, a citizen of the United States, and a resident of Marion, in the county of Grant and State of Indiana, have invented certain new and useful Improvements in Attachments for Windshields for Automobiles; and I do hereby declare the following to be a full, clear, and exact description of the invention, such as will enable others skilled in the art to which it appertains to make and use the same.

This invention relates to improvements in attachments for wind-shields for automobiles, and more particularly to a guard of that type in which wire netting is employed,—one object of the invention being to provide a simple guard structure which may be readily applied to a wind-shield frame and easily operated to cause the wire netting of the guard to be disposed in the line of vision of the rider whether the glass panel of the wind-shield be open or closed and thus protect the eyes of the rider from the glare of headlights on approaching automobiles, or from the glare of the sun light, or from the annoyance of reflected lights on the glass of the wind-shield and also to protect the rider from dust and insects when the panel of the wind-shield is open.

A further object is to so mount the guard and connect with its supporting means that said guard may be easily moved from a vertical to a horizontal position and vice versa and held in the position to which it may be moved without the use of latch devices.

With these and other objects in view, the invention consists in certain novel features of construction and combinations of parts as hereinafter set forth and pointed out in the claims.

In the accompanying drawings; Figure 1 is a view in perspective showing my improved guard applied to a wind shield, the guard being shown in its raised position; Figure 2 is a face view showing my improvements in position for use on a wind shield, and Figure 3 is a sectional view.

The frame of a wind shield is represented at 1 and the glass of the shield is shown at 2.

My improved guard construction comprises a bar 3 provided at its respective ends with arms 4, 4, disposed at right angles to said bar, and forming a bracket to receive the pivoted guard frame 5, the latter being covered with wire netting 6 of comparatively fine mesh. The said bracket is supported on the top rail of the wind-shield by means of spring clips 7. These clips may bear at their outer end portions against the outer face of the wind-shield and at their inner ends, they are made with depending arms or extensions 8 provided at or near their lower ends with pads or rubber blocks or knobs 9 to rest against the inner face of the glass of the wind shield when the guard is in the position shown in Figure 2. The depending arms or extensions 8 of the clamps are provided with elongated slots 10 through which bolts 11 are passed, said bolts also passing through flanged washers 12 and through the bar 3 of the supporting bracket and provided with threaded portions to receive thumb nuts 13. By these means, the guard may be secured in any desired position of vertical adjustment.

The frame 5 of the guard is pivoted, as at 14 to the inner end portions of the arms 4 of the supporting bracket near the lower edges of said arms, and said frame is provided at its ends near its free edge with lugs 15 with each of which one end of a coiled spring 16 is connected, the other ends of the springs being attached to eyelets 17 secured to the inner end portions of the arms 4 near the upper edges thereof. The springs 16 will operate to hold the guard frames in a horizontal position when not in use as shown in Figure 1 and when thus disposed, said guard frame will bear against rubber knobs or cushions 18 secured to the arms 4 near the rear ends of the latter. When the guard is lowered to position for use, approximately parallel with the glass of the wind-shield, knobs or cushions 19 secured to the frame 5 will rest against the glass. With the use of the cushions or rubber knobs 9, 18 and 19, rattling of the parts when the automobile is in motion will effectually be prevented.

If desired, the netting of the guard may be colored in any desired manner and it will operate efficiently to so diffuse light rays as to protect the eyes of the rider from the glare of headlights on approaching cars and from the sunlight.

Having fully described my invention what I claim as new and desire to secure by Letters-Patent, is:—

1. In a guard attachment for windshields, the combination with a supporting bracket and means for supporting the same on a wind-shield, of a wire-netting guard pivotally supported in said bracket, and springs connected with the free end portions of said guard and also connected with the supporting bracket at points above the pivotal connections of the guard with said supporting bracket.

2. A guard attachment for wind shields, comprising supporting means attachable to a wind-shield, a supporting bracket having vertically adjustable connection with said supporting means, a guard pivotally mounted in said supporting bracket and springs connected with said bracket at points above the pivotal connections of the guard with said supporting bracket and with the guard and operable to hold the latter in operative position or in inoperative position.

3. A guard attachment for wind-shields, comprising spring clips having depending slotted arms, a supporting bracket adjustably supported by said slotted arms, a guard pivotally mounted in said bracket, and springs attached to said guard and connected with the bracket at points above the pivotal connections of the guard with the bracket and operable to hold the guard in operative or in inoperative position.

4. In a guard attachment for windshields, the combination with a bracket and means for attaching the same to a windshield, said bracket having parallel arms at its ends, of a guard pivoted between said arms, cushioning knobs secured to said arms, cushioning knobs secured to the guard, and springs operable to hold the guard in inoperative position against the knobs on the arms of the bracket and to hold the guard in operative position with the knobs on said guards in contact with the wind-shield.

5. In a guard attachment for windshields, the combination of spring clips to engage a wind-shield and provided with depending arms, cushioning knobs secured to said arms to bear against the glass of the wind shield, a bracket secured to said arms, cushioning knobs on said bracket, a guard pivoted in said bracket, cushioning knobs secured to said guard, and springs connected with said guard and the bracket, said springs being operable to hold the guard in inoperative position against the knobs on the bracket and to hold the guard in operative position with the knobs thereon bearing against the glass of the wind shield.

In testimony whereof, I have signed this specification in the presence of two subscribing witnesses.

BURR CUSTER.

Witnesses:
JAMES T. MAHER,
IRA FULLHART.